(12) United States Patent
Pensi

(10) Patent No.: US 8,844,211 B2
(45) Date of Patent: Sep. 30, 2014

(54) OFFICE WORKWALL SYSTEM

(75) Inventor: Jorge Pensi, Barcelona (ES)

(73) Assignee: Steelcase Inc., Grand Rapids, MI (US)

( * ) Notice: Subject to any disclaimer, the term of this patent is extended or adjusted under 35 U.S.C. 154(b) by 35 days.

(21) Appl. No.: 13/391,631

(22) PCT Filed: May 27, 2011

(86) PCT No.: PCT/US2011/038293
§ 371 (c)(1),
(2), (4) Date: Feb. 22, 2012

(87) PCT Pub. No.: WO2011/150309
PCT Pub. Date: Dec. 1, 2011

(65) Prior Publication Data
US 2012/0186164 A1    Jul. 26, 2012

Related U.S. Application Data

(60) Provisional application No. 61/349,672, filed on May 28, 2010.

(51) Int. Cl.

| | |
|---|---|
| E04B 2/74 | (2006.01) |
| E04H 12/18 | (2006.01) |
| A47F 5/08 | (2006.01) |
| A47B 43/00 | (2006.01) |
| A47B 47/00 | (2006.01) |
| A47B 96/14 | (2006.01) |
| A47B 96/02 | (2006.01) |
| E06B 3/50 | (2006.01) |
| F16B 7/04 | (2006.01) |

(52) U.S. Cl.
CPC ........... *E04B 2/7433* (2013.01); *A47B 96/1416* (2013.01); *A47B 96/1458* (2013.01); *E06B 3/5045* (2013.01); *E04B 2002/7483* (2013.01); *F16B 7/0446* (2013.01); *A47B 96/027* (2013.01)
USPC ............ 52/36.6; 52/36.5; 52/646; 211/90.01; 211/192

(58) Field of Classification Search
USPC ............ 52/36.1, 36.4, 36.5, 27, 220.7, 220.2, 52/239, 235, 506.01, 506.03, 506.05, 52/506.06, 36.6, 506.08, 646; 211/90.01, 211/192; 312/107, 245, 265.1
See application file for complete search history.

(56) References Cited

U.S. PATENT DOCUMENTS 2,736,399 A * 2/1956 Spencer ....................... 52/404.1
3,374,590 A * 3/1968 Milton ......................... 52/220.7
(Continued)

FOREIGN PATENT DOCUMENTS

KR    100455516 B1    11/2004

*Primary Examiner* — Ryan Kwiecinski
(74) *Attorney, Agent, or Firm* — Price Heneveld LLP

(57) ABSTRACT

An office workwall assembly includes a work frame assembly that includes a pair of vertical frame members, a horizontal frame member extending between and operably coupled to the pair of vertical frame members, wherein the pair of vertical frame members each include at least one longitudinally-extending channel. The frame assembly further includes a pair of frame mounting bracket secured within the at least one channel by at least one mechanical fastener and adapted to be secured to a wall structure and support the frame assembly from the wall structure, wherein the vertical frame members may be vertically, horizontally and/or angularly adjusted with respect to the mounting bracket positioned within the channel. The workwall assembly also includes an office utility assembly operably coupled with and supported by the pair of vertical frame members, wherein the office utility assembly is cantilevered from the frame assembly.

24 Claims, 16 Drawing Sheets

(56) References Cited

U.S. PATENT DOCUMENTS

| | | | |
|---|---|---|---|
| 4,232,497 A * | 11/1980 | Meschnig | 52/506.06 |
| 4,634,010 A * | 1/1987 | Otema | 211/96 |
| 4,984,400 A * | 1/1991 | Bockmiller | 52/241 |
| 5,371,981 A * | 12/1994 | Bockmiller | 52/36.5 |
| 5,495,952 A * | 3/1996 | Kainz | 211/90.04 |
| 5,517,795 A * | 5/1996 | Doke | 52/36.4 |
| 6,047,838 A * | 4/2000 | Rindoks et al. | 211/187 |
| 6,109,461 A * | 8/2000 | Kluge et al. | 211/90.01 |
| 6,138,583 A * | 10/2000 | Mahone et al. | 108/108 |
| 6,659,295 B1 * | 12/2003 | De Land et al. | 211/187 |
| 7,478,504 B2 * | 1/2009 | Huebner et al. | 52/238.1 |
| 7,478,785 B2 * | 1/2009 | Herron et al. | 248/243 |
| 7,762,023 B2 * | 7/2010 | Kasdorf et al. | 52/36.4 |
| 7,967,268 B2 * | 6/2011 | Herron et al. | 248/243 |
| 2001/0050262 A1 | 12/2001 | Labruna Jr. et al. | |
| 2005/0279033 A1 * | 12/2005 | Faber et al. | 52/36.4 |
| 2007/0079561 A1 * | 4/2007 | Hopkins | 52/36.5 |
| 2008/0197253 A1 * | 8/2008 | Thompson | 248/220.22 |
| 2008/0272076 A1 * | 11/2008 | Davenport | 211/90.01 |
| 2009/0127413 A1 * | 5/2009 | Herron et al. | 248/220.21 |

* cited by examiner

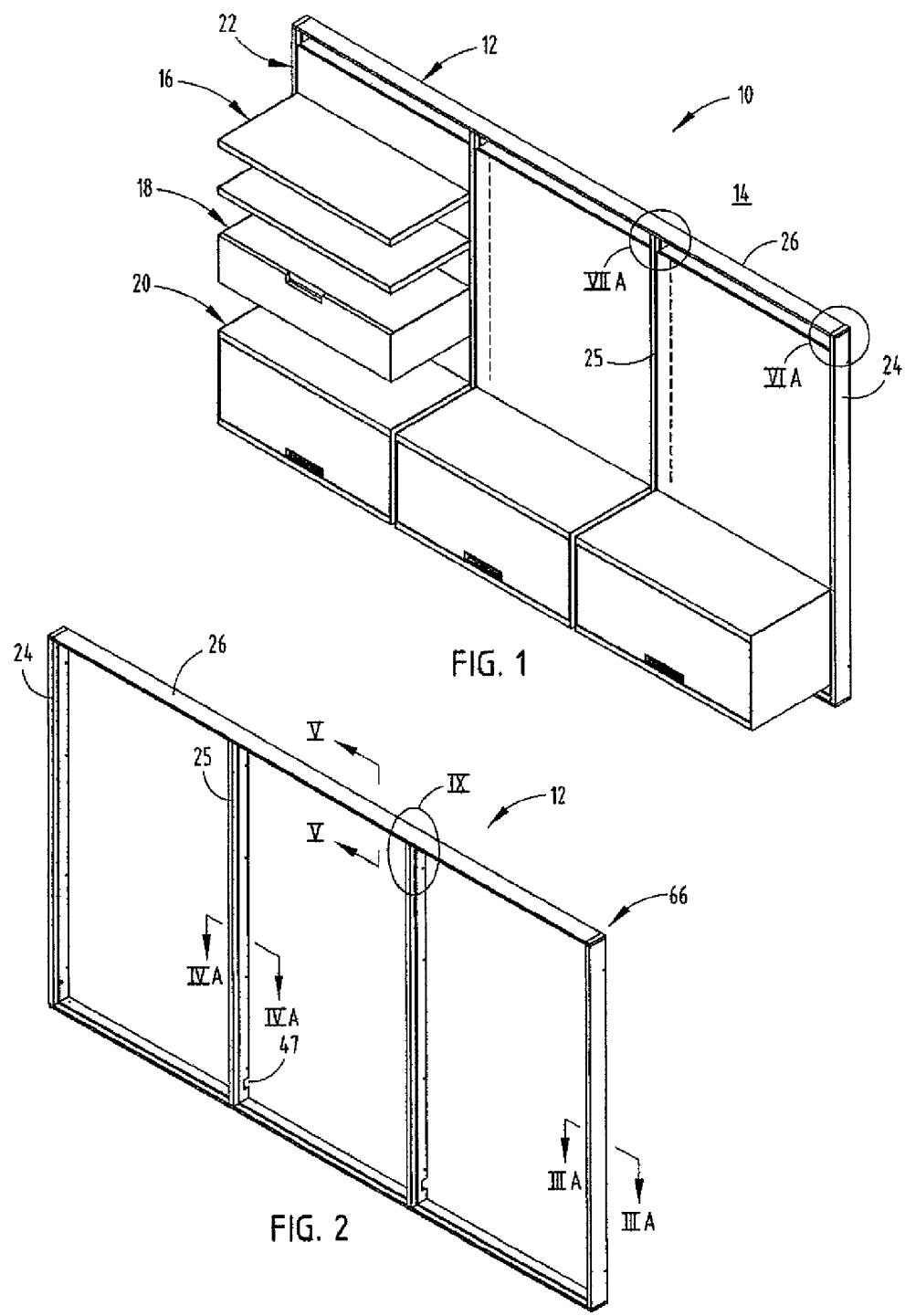

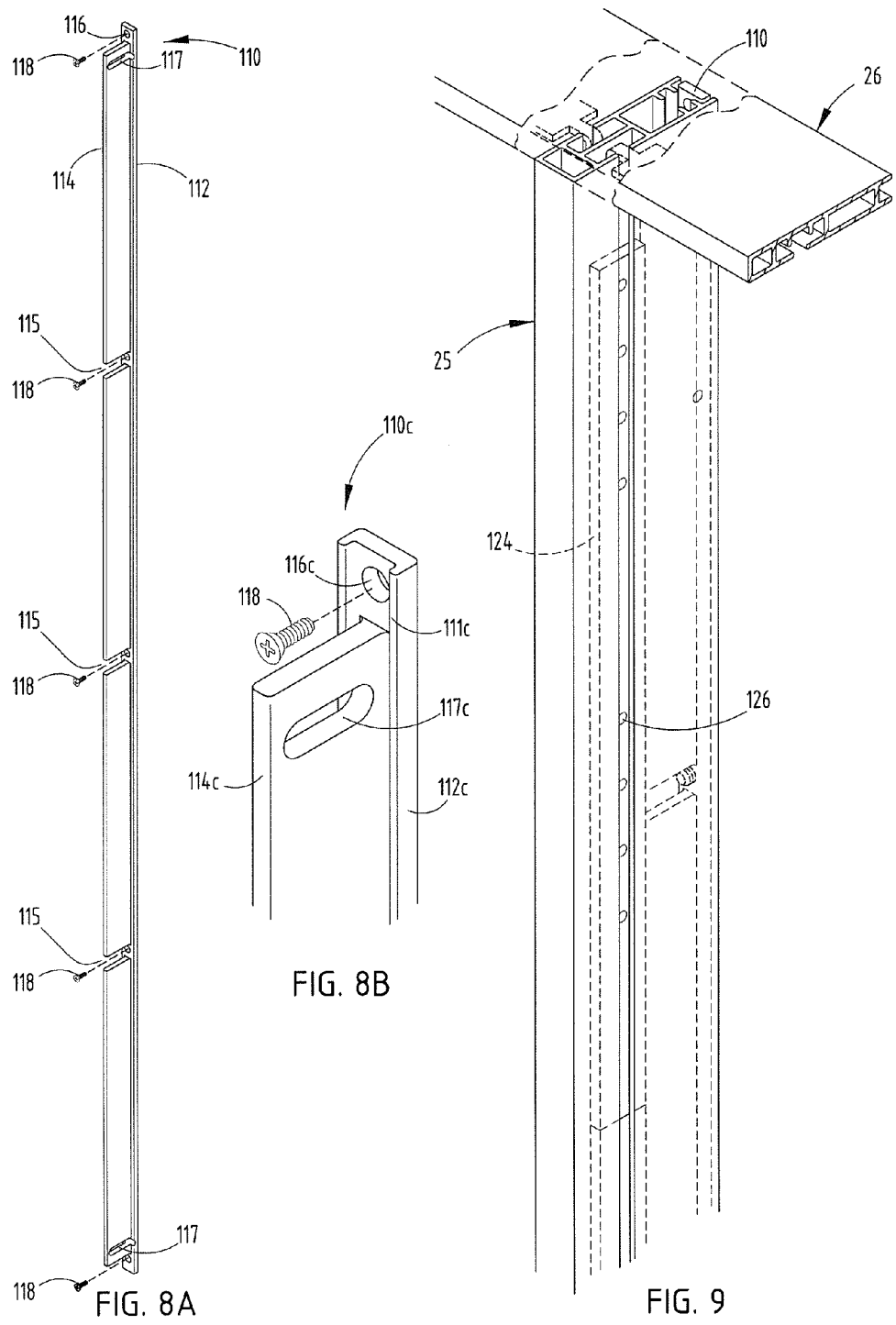

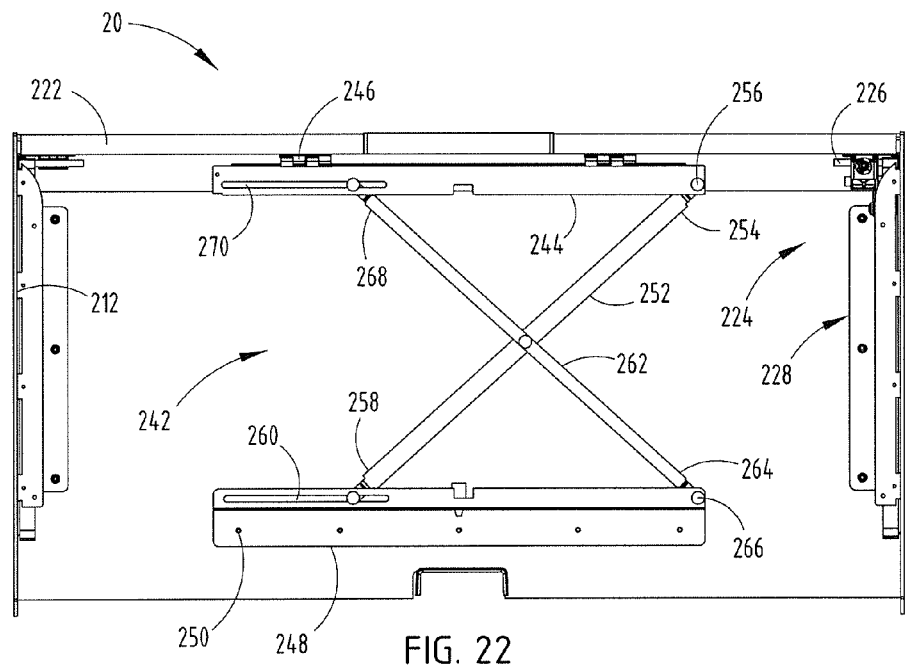
FIG. 22
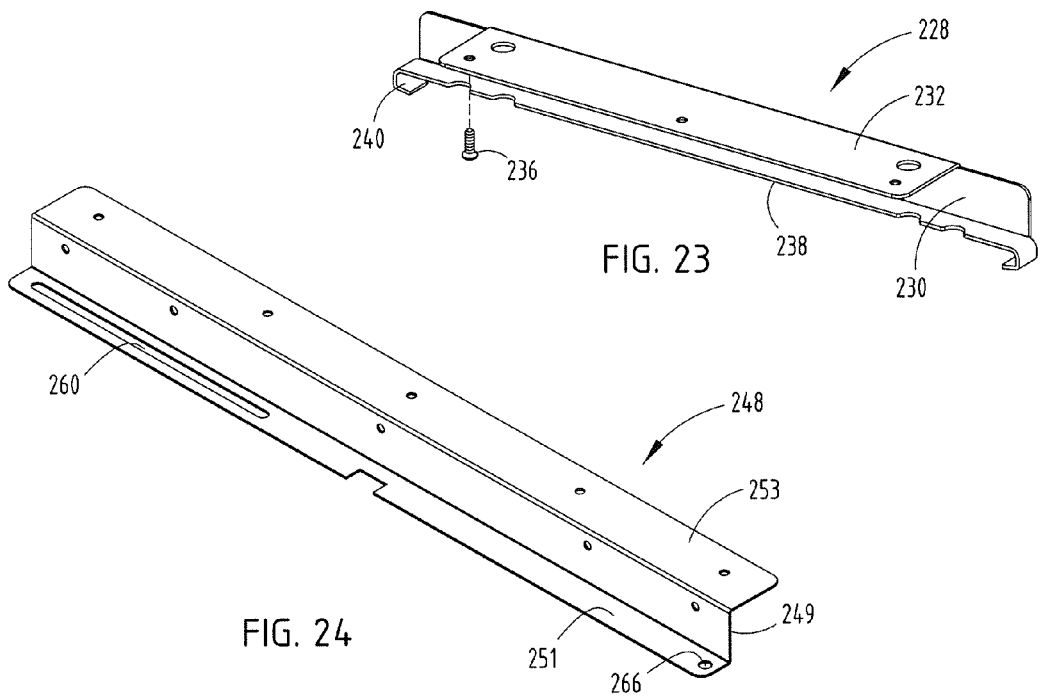
FIG. 23
FIG. 24

OFFICE WORKWALL SYSTEM

CROSS REFERENCE TO RELATED APPLICATIONS

This application claims the benefit of U.S. Provisional Patent Application No. 61/349,672, filed on May 28, 2010, entitled "OFFICE WORKWALL SYSTEM," the entire disclosure of which is incorporated herein by reference.

BACKGROUND OF THE INVENTION

The present invention relates to an office workwall assembly, and in particular to a workwall assembly that comprises a frame assembly mountable to a wall structure and adapted to support office utilities assemblies thereon, such as shelving assemblies, storage assemblies, and drawer assemblies

SUMMARY OF THE INVENTION

One aspect of the present invention is to provide an office workwall assembly that comprises a frame assembly comprising a pair of vertical frame members, at least one horizontal frame member extending between and operably coupled to the pair of vertical frame members, wherein at least a select one of a group comprising a pair of vertical frame members and the at least one horizontal frame member includes at least one longitudinally-extending channel, and at least one frame mounting bracket positioned within the at least one channel by at least one mechanical fastener and adapted to be secured to a wall structure and support the frame assembly from a wall structure, and wherein the at least select one of frame member may be adjusted in at least a select one of a vertical direction and a horizontal direction with the at least one frame mounting member positioned within the at least one channel. The office workwall assembly further comprises an office utility assembly operably coupled with and supported by the pair of vertical frame members, wherein the office utility assembly is cantilevered from the frame assembly.

Another aspect of the present invention is to provide an office workwall assembly that comprises a frame assembly comprising a pair of vertical frame members each including a first longitudinally-extending channel and a second longitudinally-extending channel, and at least one horizontal frame member extending between and operably coupled to the pair of vertical frame members. The frame assembly further comprises a pair of frame mounting brackets each having a first portion adapted to be secured to a wall structure and a second portion extending substantially orthogonal to the first portion and secured within the first channel of the vertical frame members by at least one mechanical fastener, and a pair of support members telescopingly received within the second channel of the vertical frame member, each support member including a plurality of apertures spaced along a length thereof that are adapted to receive mechanical fasteners therein. The office workwall assembly further comprises an office utility assembly including a shelf surface and a pair of support brackets coupled with the shelf surface and operably coupled with and supported by the mechanical fasteners received within the apertures of the pair of support members, wherein the office utility assembly is cantilevered from the frame assembly.

Yet another aspect of the present invention is to provide a method for securing an office workwall assembly to a wall structure comprising providing a frame assembly that comprises a pair of vertical frame members, wherein at least a select one of a group comprising the pair of the vertical frame members and the horizontal frame members include at least one longitudinally-extending channel, at least one horizontal frame member extending between and operably coupled to the pair of vertical frame members, and a pair of mounting members each having a first portion and a second portion extending substantially orthogonally from the first portion. The method also includes providing an office utility assembly including a shelf surface and a pair of support brackets coupled to the shelf surface, and securing the first portion of each of the frame mounting brackets to the wall structure. The method further includes aligning the at least one of the frame members with the at least one mounting bracket such that the second portion of the at least one mounting bracket is received within the at least one channel of the at least select one of the frame members, adjusting at least one of a vertical position and a horizontal position of the at least select one of the frame members with respect to the at least one mounting bracket subsequent to the alignment of the at least select one of the frame members with the at least one frame member, securing the pair of vertical frame members to the pair of mounting brackets by a plurality of mechanical fasteners, and supporting the office utility assembly from the frame assembly by operably coupling the pair of support brackets with the pair of vertical frame members.

The present inventive office workwall assembly includes a design that may be assembled and secured to an associated wall surface with standard tools by even relatively unskilled personnel. The workwall assembly is efficient in assembly, economical to manufacture, capable of a long operating life, and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 1 is a perspective view of the office workwall assembly embodying the present invention;

FIG. 2 is a perspective view of a frame assembly of the office workwall assembly;

FIG. 8A is a perspective view of a frame mounting bracket of the frame assembly;

FIG. 8B is a perspective view of an end of an alternative frame mounting bracket of the frame assembly;

FIG. 9 is perspective view of the horizontal frame member and the vertical frame member of the frame assembly of the area IX, FIG. 2, a plurality of frame mounting brackets being shown in phantom line;

FIG. 22 is a bottom plan view of the storage assembly with a bottom wall of the storage assembly removed to show the inner workings thereof;

FIG. 23 is a perspective view of a side guide bracket of the storage assembly;

FIG. 24 is a perspective view of a rear guide bracket of the storage assembly;

DETAILED DESCRIPTION OF PREFERRED EMBODIMENT

Figure 3A:
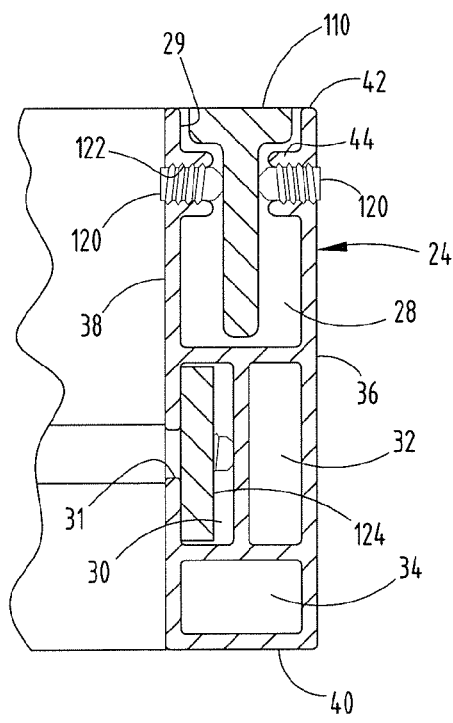
FIG. 3A is a cross-sectional bottom plan view of a first vertical frame member taken along the line III-III, FIG. 2.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates an office workwall assembly embodying the present invention. In the illustrated example, the office workwall assembly 10 includes a frame assembly 12 secured to and supported by a wall structure 14. The frame assembly 12 supports a plurality of shelf assemblies 16, drawer assemblies 18 and storage assemblies 20 from the wall structure 14. A plurality of panel assemblies 22 may also be supported from the frame assembly 12 and interspaced with the shelf assemblies 16, the drawer assemblies 18 and the storage assemblies 20, as well as other assemblies (not shown), such as desks, tables and other worksurfaces.

As best illustrated in FIG. 2, the frame assembly 12 includes a pair of vertical end frame members 24, a plurality of vertical intermediate frame members 25, and a pair of horizontal frame members 26 extending between and coupled to the vertical end frame members 24 and the vertical intermediate frame members 25. As best illustrated in FIG. 3A, each vertical end frame member 24 is provided a rectangularly-shaped cross-sectional configuration and includes a rearwardly-opening, T-shaped, longitudinally-extending rear channel 28, an inwardly-opening, rectangularly-shaped, longitudinally-extending side channel 30, a longitudinally-extending first interior channel 32 extending alongside the side channel 30, and a longitudinally-extending second interior channel 34. A longitudinally-extending slot 29 provides access to an interior of the rear channel 28 along the length of the frame member 24. The outer surface of each of the end vertical frame members 24 is defined by an outer surface 36, an inner surface 38, a front surface 40 and a rear surface 42. Two sets of reinforcement rib pairs 44 extend longitudinally within the rear channel 28.

Figure 3B:
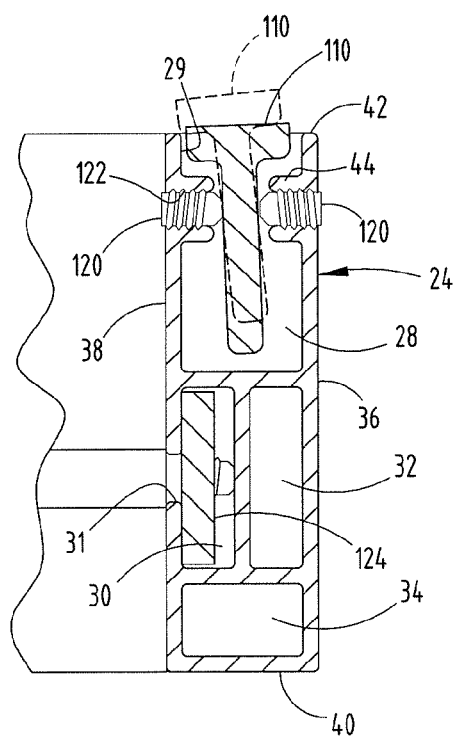
FIG. 3B is a cross-sectional bottom plan view of the first vertical frame member taken along the line III-III, FIG. 2, with a mounting bracket skewed with respect to the vertical frame member.
Figure 4A:
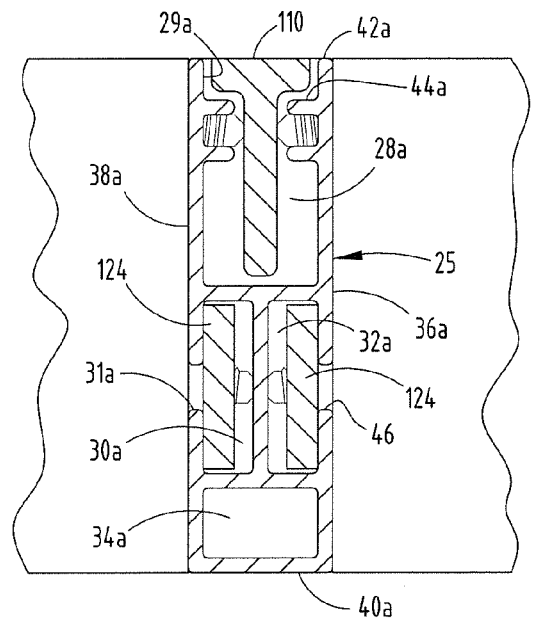
FIG. 4A is a cross-sectional bottom plan view of a second vertical frame member taken along the line IV-IV, FIG. 2.

Each vertical intermediate frame member 25 (FIG. 4A) is similar in overall configuration to the vertical frame members 24, and as a result, similar parts referring to vertical frame members 25 in FIG. 3, and to vertical frame members 24 in FIG. 4A, are respectively represented by the same, corresponding reference numeral except for the suffix "a" in the numerals of the latter. The most notable exception between the intermediate frame member 25 and the vertical frame member 24 is that the channel 32a of the intermediate frame member 25 opens towards an interior of the overall frame assembly. Specifically, a longitudinally-extending slot 46 provides access to an interior of the channel 32. Each vertical frame member 25 includes a relief 47 (FIG. 1) located along the length thereof and extending forwardly from the rear surface 42a thereof. Each relief 47 is configured to allow communication and power lines to be horizontally routed through the frame assembly 12 between the vertical frame members 25 and the wall structure 14.

Figure 5:
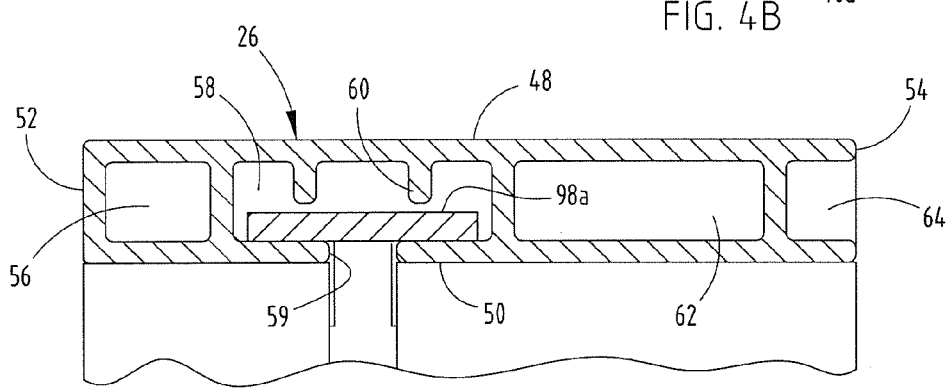
FIG. 5 is a side elevational view of a horizontal frame member taken along the line V-V, FIG. 2.

As best illustrated in FIG. 5, each horizontal frame member 26 is provided a substantially rectangularly-shaped cross-sectional configuration and is defined by a top surface 48, a bottom surface 50, a front surface 52 and a rear surface 54. Each horizontal frame member 26 includes a forwardly-located interior channel 56, an intermediate, downwardly-opening channel 58 that includes a pair of longitudinally-extending structural support ribs 60, an intermediate interior channel 62, and a rearwardly-opening channel 64. A longitudinally-extending slot 59 provides access to an interior of the channel 58 along the length of the frame members 26.

Figure 6A:
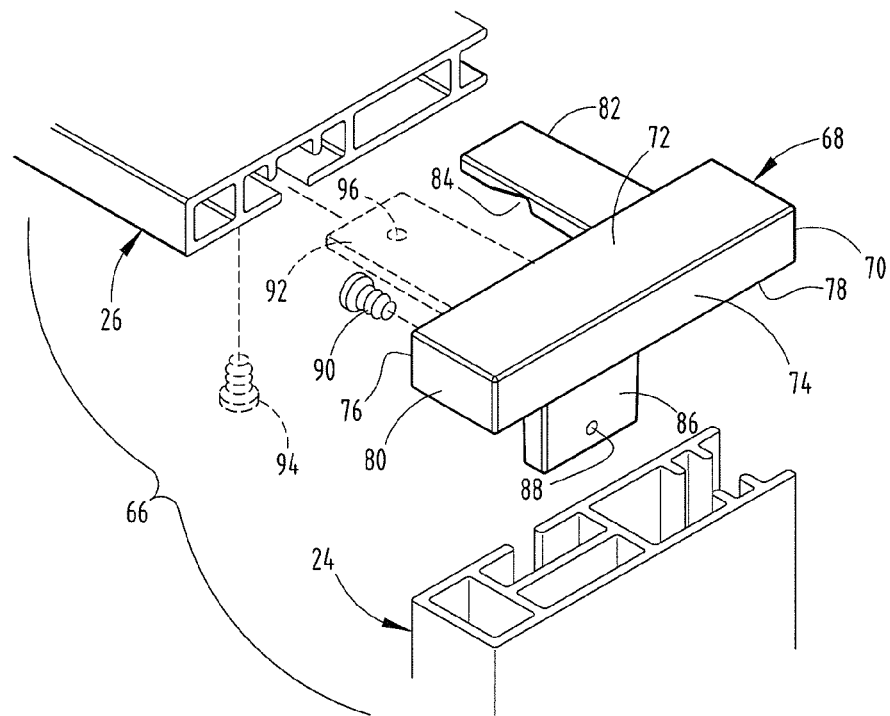
FIG. 6A is an exploded perspective view of a corner assembly of the frame assembly of the area VI, FIG. 1.

The vertical frame members 24 and the horizontal frame members 26 are each coupled to one another via a corner connector assembly 66 (FIG. 6). The corner connector assembly 66 includes a corner connector 68 that includes a rectangular-shaped body portion 70 having a top surface 72, an outer side surface 74, an inner side surface 76, a bottom surface 78, and a front surface 80. A frictional engagement tab 82 extends inwardly from the inner side surface 76 and includes a relief 84 along the length thereof, so as to allow the frictional engagement tab 82 to elastically deform along the length thereof. An engagement tab 86 extends downwardly from the bottom surface 78 and includes an aperture which receives a mechanical fastener such as a screw 90 therein during assembly. In assembly, each vertical frame member 24 is secured to a corresponding horizontal frame member 26 by inserting the frictional engagement tab 82 of the corner connector 68 into the interior channel 62 of the horizontal frame member 26 until the inner side surface 76 of the body portion 70 abuts the horizontal frame member 26. The frictional engagement tab 82 is configured such that it is frictionally held within the channel 62. The engagement tab 86 is inserted into the side channel 30 until the bottom surface 78 of the body portion 70 abuts the vertical frame member 24. The screw 90 secures the engagement tab 86 within the channel 30 by impinging on the vertical frame member 24.

In an alternative embodiment, the corner connector 68 includes a second engagement tab 92 extending inwardly from the inner side surface 76. The second engagement tab 92 is received within the channel 58 of the horizontal frame member 26 and is secured thereto via a screw 94 received within an aperture 96 of the engagement tab 92 and impinging on the horizontal frame member 26.

Each horizontal frame member 26 is secured to a vertical intermediate frame member 25 (FIG. 7) at a position along the length of the horizontal frame member 26 via a connector assembly 97 that includes a connector member 98 having a rectangularly-shaped first portion 100, and a rectangularly-shaped second portion 102 extending substantially orthogonally from the first portion 100 and connected thereto via a necked-down portion 104. The first portion 100 and the second portion 102 each include an aperture 106 extending therethrough. In assembly, the first portion 100 is received within the channel 58 of the horizontal frame member 26 while the second portion 102 is received within the channel 30A of the vertical frame member 25 such that the necked-down portion 104 extends through the slot 59 and the slot 31. The first portion 100 and the second portion 102 are secured within channel 58 and channel 30a, respectively, by mechanical fasteners such as screws 108 that are received within the apertures 106 and impinge upon the corresponding frame members. It is noted that a mirror image of this connector member 98 is positioned within the channel 32a of each intermediate frame member 25 and the channel 58 of the horizontal frame member 26 to further secure the intermediate frame member 25 to the horizontal frame member 26. It is noted that the connector member 98 may be utilized as a corner connector between vertical frame members 24 and horizontal frame members 26, wherein the frame members 24, 26 each have mitered end surfaces.

Figure 7A:
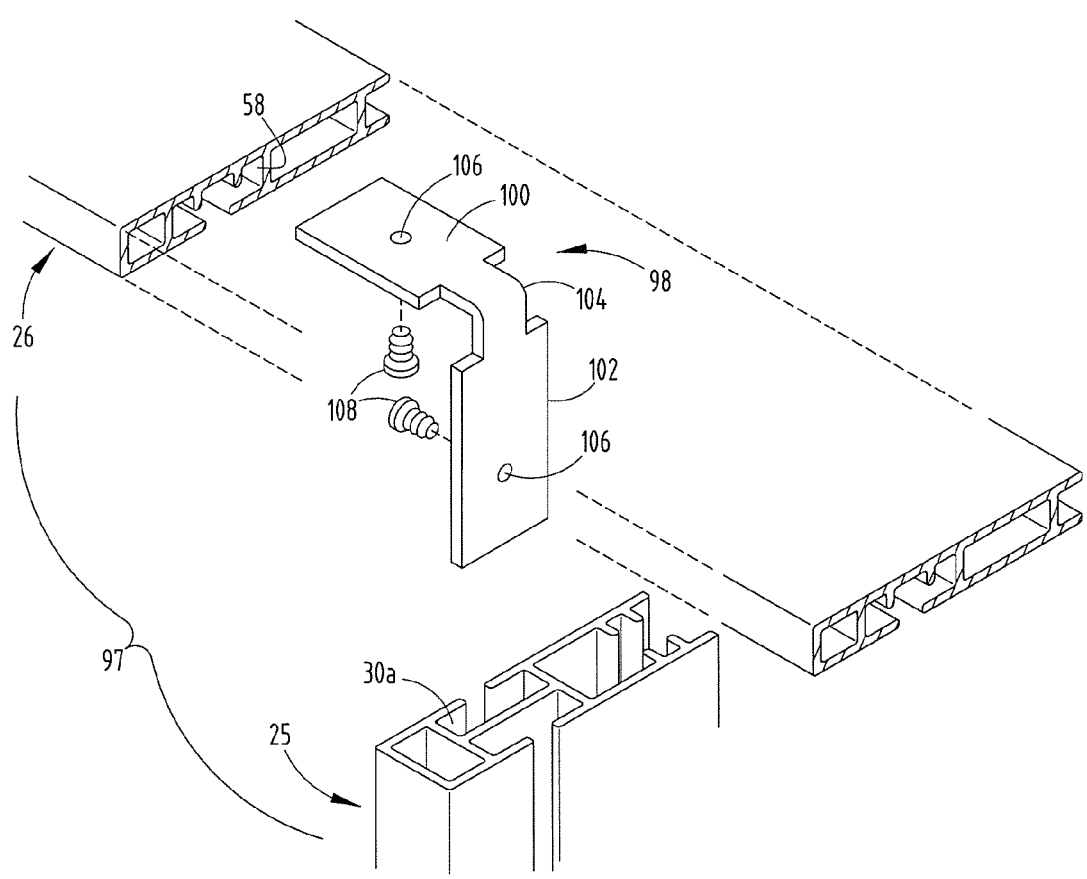
FIG. 7A is an exploded perspective view of a vertical member to horizontal member connection assembly of the area VII, FIG. 1.
Figure 7B:
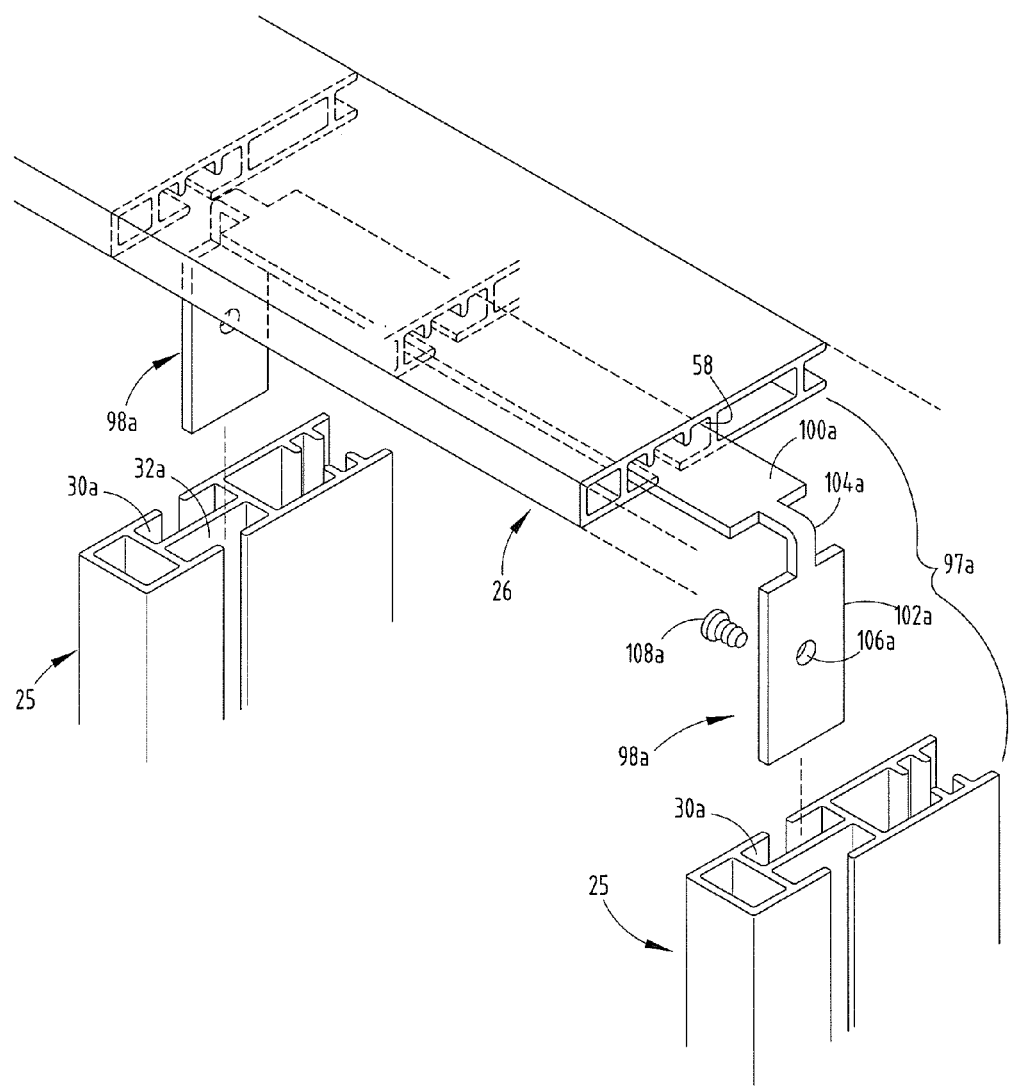
FIG. 7B is an exploded perspective view of an alternative vertical member to horizontal member connection assembly of the area VII, FIG. 1.

Alternatively, each horizontal frame member 26 (FIG. 7B) is secured to the vertical intermediate frame members 25 (and vertical frame members 24) (FIG. 7B) via a connector assembly 97a that includes a connector member 98a having a rectangularly-shaped first portion 100a, and a pair of rectangularly-shaped second portions 102a extending substantially orthogonally from the first portion 100a and each connected thereto via a corresponding necked-down portion 104a. As the elements of the connector assembly 97a is similar to previously described connector assembly 97, such that similar elements of FIG. 7A and FIG. 7B are represented by similar corresponding reference numerals, respectfully, except for the suffix "a" within the latter. The second portions 102a each include an aperture 106a extending therethrough. In assembly, the first portion 100a is slidably received within the channel 58 of the horizontal frame member 26 while the second portions 102a are received within the channel 30A of the corresponding vertical frame member 25 (or vertical frame member 24) such that the necked-down portion 104a extends through the slot 59 and the slot 31. The second portions 102a are secured within channel 58 and channel 30a, respectively, by mechanical fasteners such as screws 108a that are received within the apertures 106a and impinge upon the corresponding frame members. It is noted that the connector member 98a may be utilized as a corner connector between vertical frame members 24 and horizontal frame members 26, wherein the frame members 24, 26 each have mitered end surfaces.

Figure 6B:
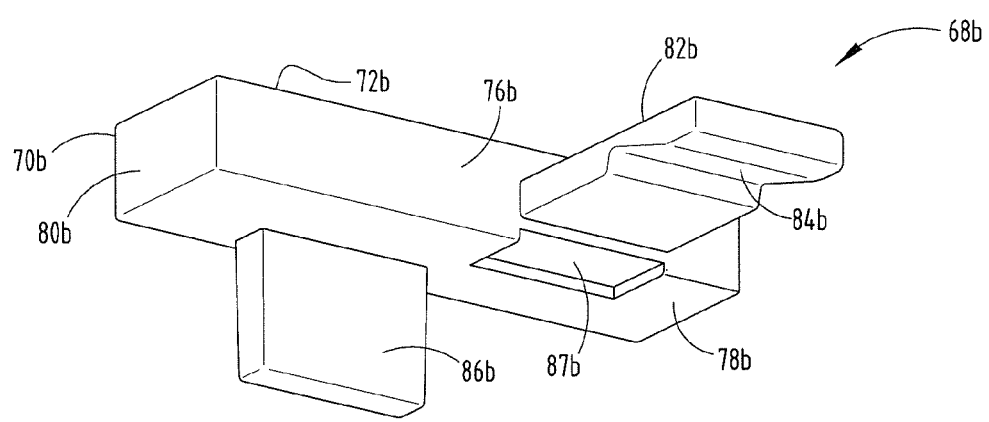
FIG. 6B is a perspective view of a connector member.

Alternatively, the vertical frame members 24 and the horizontal frame members 26 are each coupled to one another via a corner connector 68b (FIG. 6B). The corner connector 68b is similar to the previously described corner connector 68 such that similar reference numerals are utilized in FIG. 6a and in FIG. 6, except for the use of the suffix "b" within the numerals of the latter. The corner connector 68b includes a rectangular-shaped body portion 70b having a top surface 72b, an inner side surface 76b, a bottom surface 78b, and a front surface 80b. A frictional engagement tab 82b extends inwardly from the inner side surface 76b and includes a relief 84b along the length thereof, so as to allow the frictional engagement tab 82b to elastically deform along the length thereof. An engagement tab 86b extends downwardly from the bottom surface 78b. The body portion 70b includes a relief 87b that provides clearance for the connector member 98 (FIG. 7) (or the connector member 98a (FIG. 7A)), such that the connector member 98 may be used in conjunction with the corner connector 68b. Alternatively, each vertical and horizontal frame member could have a mitered profile and a miter joint created at the corner of the frame locked in place with a connector assembly 97 or 97a.

The frame assembly 12 further includes a plurality of frame mounting brackets 110 that are utilized to mount the frame assembly 12 to the associated wall structure 14. Each frame mounting bracket 110 (FIG. 8A) includes a first portion 112 and a second portion 114 extending orthogonally from the first portion 112. The first portion 112 and the second portion 114 each extend longitudinally along the length of the frame mounting bracket 110 and cooperate to form a T-shaped cross-sectional configuration. The first portion 112 includes a plurality of mounting apertures 116 adapted to receive mechanical mounting hardware therein, such as mechanical fasteners, such as screws 118, to secure the frame mounting bracket 110 to the wall structure 14. The second portion 114 includes a plurality of reliefs 115 along the length therein wherein the apertures 116 of the first portion 112 are located. The second portion 114 further includes a pair of elongated apertures 117 located near the ends of the frame mounting brackets 110 which are adapted to receive mounting hardware therein, as described below. Alternatively, the first portion 112c (FIG. 8B) of the mounting bracket 110c includes a pair of longitudinally-extending flanges 111c that extend orthogonally inward and increase the structural rigidity of the mounting bracket 110c along the length thereof. The length of connector 97a provides an easy way to ensure the desired spacing between intermediate frame members 25 (and vertical frame members 24).

Figure 4B:
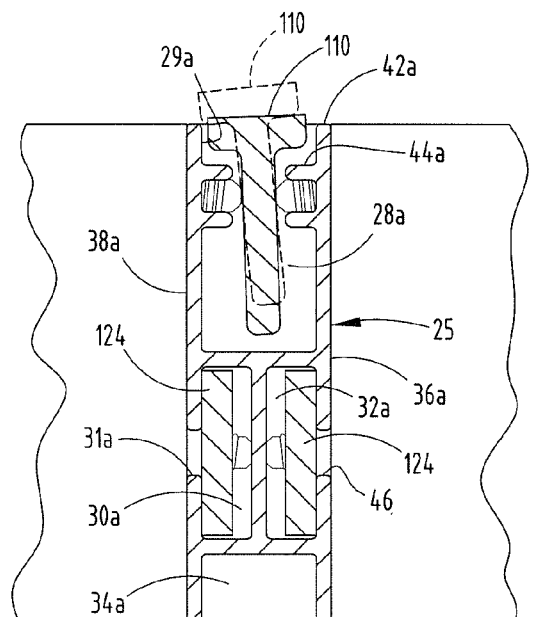
FIG. 4B is a cross-sectional bottom plan view of the second vertical frame member taken along the line IV-IV, FIG. 2, with a mount bracket skewed with respect to the vertical frame member.

In assembly, the frame mounting brackets 110 are secured to the wall structure 14 via a plurality of screws 118. Corresponding vertical frame members 24, 25 are then aligned with the mounting brackets 110 such that the mounting brackets 110 are located within the slot 29, 29a of the vertical frame member 24, 25. The vertical frame members 24, 25 are then aligned with respect to the vertical and horizontal and with respect to one another and secured to the mounting brackets 110 via a plurality of mechanical fasteners such as screws 120. The screws 120 are threaded through apertures 122 spaced along the length of the vertical frame members 24 such that the screws 120 impinge upon the corresponding frame mounting brackets 110. Self-tapping screws 120 may also be utilized. As best illustrated in FIGS. 3B and 4B, the spacing between the mounting brackets 110 and the associated vertical frame member 23, 24 allows for both vertical, horizontal and angular adjustment of the vertical frame bracket 23, 24 with respect to the mounting bracket 110 subsequent to the mounting bracket 110 being located within the channel 29, 29a of the vertical frame member 23, 24. The adjustability of the vertical frame members 24, 25 with respect to the mounting brackets 110 prior to tightening of the screws 120 allows the frame assembly 12 to be properly aligned vertically, horizontally and angularly even when the workwall assembly 10 is installed on wall structures 14 that are uneven, out-of-plum, and the like. In the use position, the mounting brackets 110 may be parallel to or in angled relationship to the vertical and horizontal frame members 23, 24, 26. The screws 120 can impinge along the width of second portion 114 of the associated mounting bracket 110. The front faces of the vertical and horizontal frame members 22, 24, 26 define a planar surface that is vertically and horizontally level. It is noted that the apertures 122 which receive the screws 120 are located between the structural reinforcement ribs 44, thereby providing additional structural support to the vertical frame member 24 proximate the apertures 122. Each frame mounting bracket 110 is received within a channel 28 of a corresponding vertical frame member 24 such that the frame mounting bracket 110 is concealed from view subsequent to assembly. Once the screws 120 are installed to impinge upon the mounting brackets 110, a screw 120 is inserted through the corresponding, vertical frame member 24, 25 such that it is received into an aperture 117 of the mounting bracket 110, thereby vertically supporting the overall frame assembly 12. It is noted that the vertical frame member 24, 25 may be supported by the screw 120 and the aperture 117 prior to tightening of the screws 120 that impinge upon the mounting brackets 110. The elongation of the apertures 117 allow proper alignment of the screw 120 with the aperture 117 even in applications wherein the wall structure 14 is severely uneven or out of plum. The horizontal frame members 26 are then secured to the vertical frame members 24, 25 via the corner connectors assemblies 66 and the connector assemblies 97.

Each of the shelf assemblies 16, drawer assemblies 18 and storage assemblies 20 are supported between the vertical frame members 24, 25 at selective vertical positions via support members 124 (FIGS. 1, 3 and 4) that are telescopingly received within channel 30 of vertical frame members 24 and channels 30a, 32a, of vertical frame members 25. Each support member 124 is provided with a rectangular cross-sectional configuration and includes a plurality of vertically-spaced threaded apertures 126 adapted to receive accessory supporting bolts therein, as discussed below. As best illustrated in FIG. 9, the support members 124 are positioned within the channels 30, 30a, 32a such that the apertures are accessible via respective slots 31, 31a, 46. It is noted that each vertical run of the support members 124 may comprises a single, integral support member 124, or a plurality of support members 124 positioned in an end-to-end orientation, as illustrated in FIG. 9.

Figure 10:
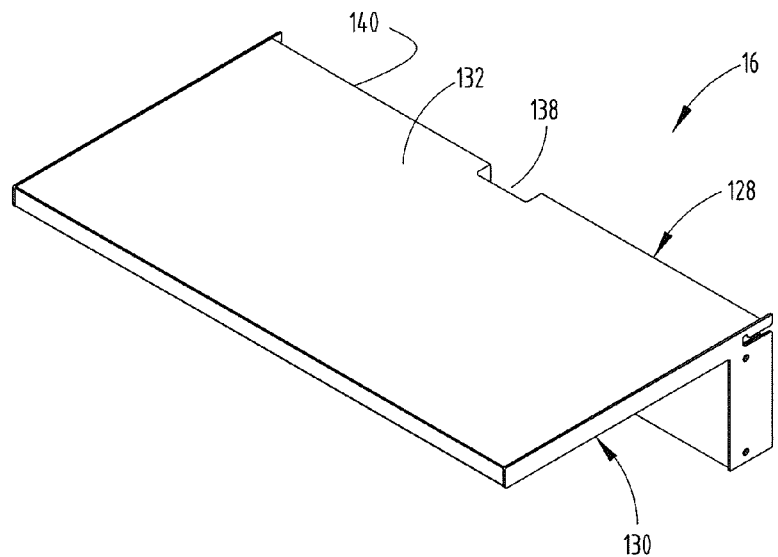
FIG. 10 is a perspective view of a first embodiment of a shelf assembly.

Each shelf assembly 16 (FIG. 10) includes a shelf member 128 supported by a pair of shelf support brackets 130. Each shelf member 128 includes an upper shelf surface 132, a lower shelf surface 134 (FIG. 11), and a pair of end surfaces 136. A cut-out or relief 138 extends forwardly from a rear edge 140 of the shelf member 128. The relief is configured to allow communication and power lines to be vertically routed through the workwall assembly 10 between the rear edge 140 of the shelf member 128 and the wall structure 14. A channel 142 extends inwardly from the end of the surfaces 136 and extends laterally across the shelf member 128. In the illustrated example, each shelf support bracket 130 (FIG. 12) has an inverted L-shaped configuration and includes a mounting portion 144 and a support portion 146 extending orthogonally from the mounting portion 144. The mounting portion 144 includes a hook-shaped mounting slot 148 and a pair of mounting apertures 150. An arm 152 extends orthogonally inward from the support portion 146. In assembly, each shelf support bracket 130 is secured to the shelf member 128 by positioning the arm 152 of the shelf support bracket 130 into a corresponding channel 142 of the shelf member 128, and securing the arm 152 therein by a plurality of mechanical fasteners such as screws 154 that are received within apertures 156 of the shelf member 128 and apertures 158 of the arms 152. The shelf assembly 16 is mounted to the frame assembly 12 by positioning the mounting slots 148 of the support brackets 130 over shoulder bolts 160, previously secured within the apertures 126 of the associated support member 124, and aligning the bolts 160 within the hook-portion of the slots 148, the shoulder bolts 160 allowing for float tolerancing of the supported elements. In this manner the shelf assembly 16 is temporarily supported from the frame assembly 12 while the apertures 150 of the shelf support brackets 130 are properly aligned with apertures 126 within the support members 124 and secured thereto via additional bolts 160. The bolts 160 secured within the apertures 150 are also utilized to support out skins thereon, as described below. The brackets can be adjusted left/right on the shoulder bolts to account for manufacturing tolerance differences so that the shelf is centered between the vertical/intermediate supports.

Figure 11:
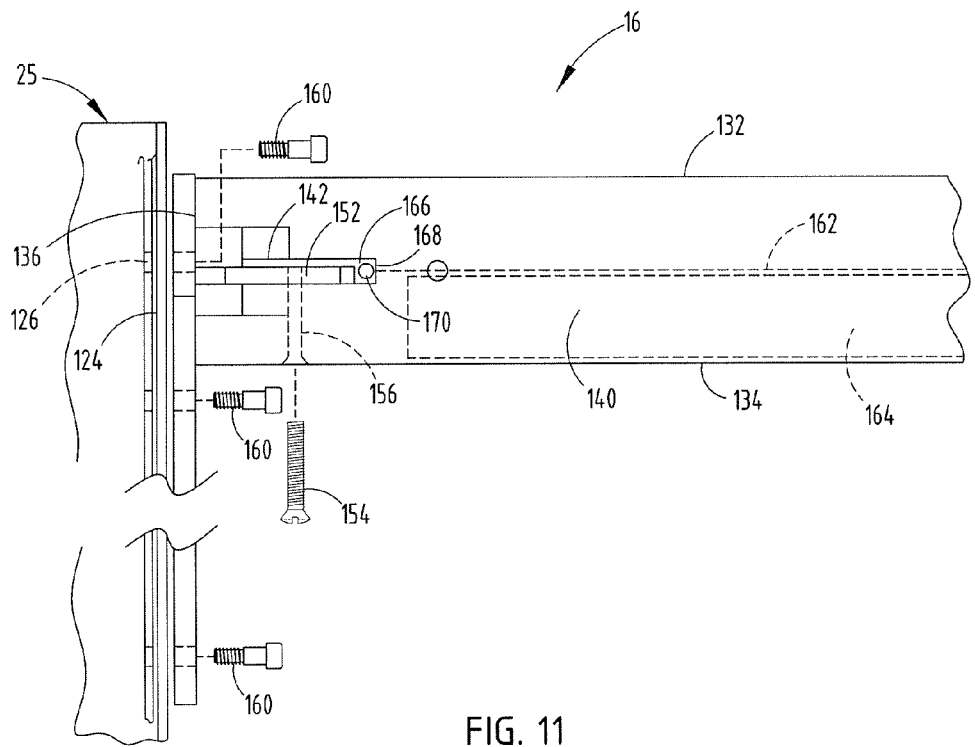
FIG. 11 is a partial rear elevational view of the first embodiment of the shelf assembly.
Figure 12:
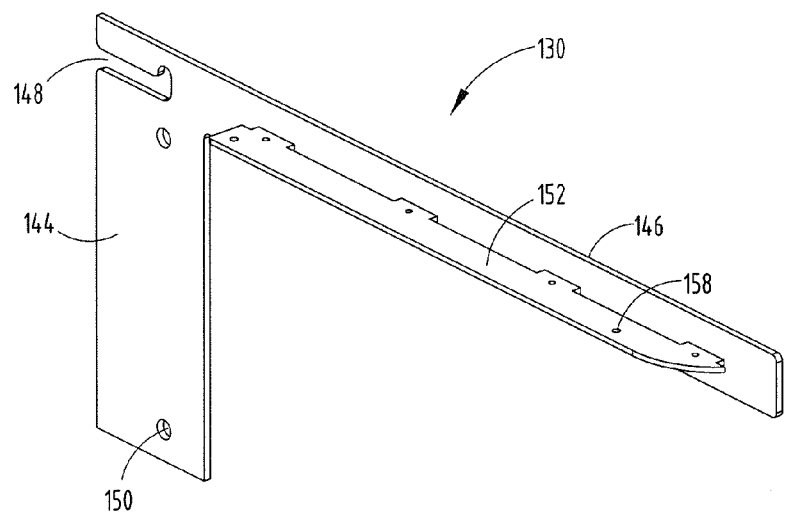
FIG. 12 is a perspective view of a mounting bracket of the first embodiment of the shelf assembly.
Figure 13:
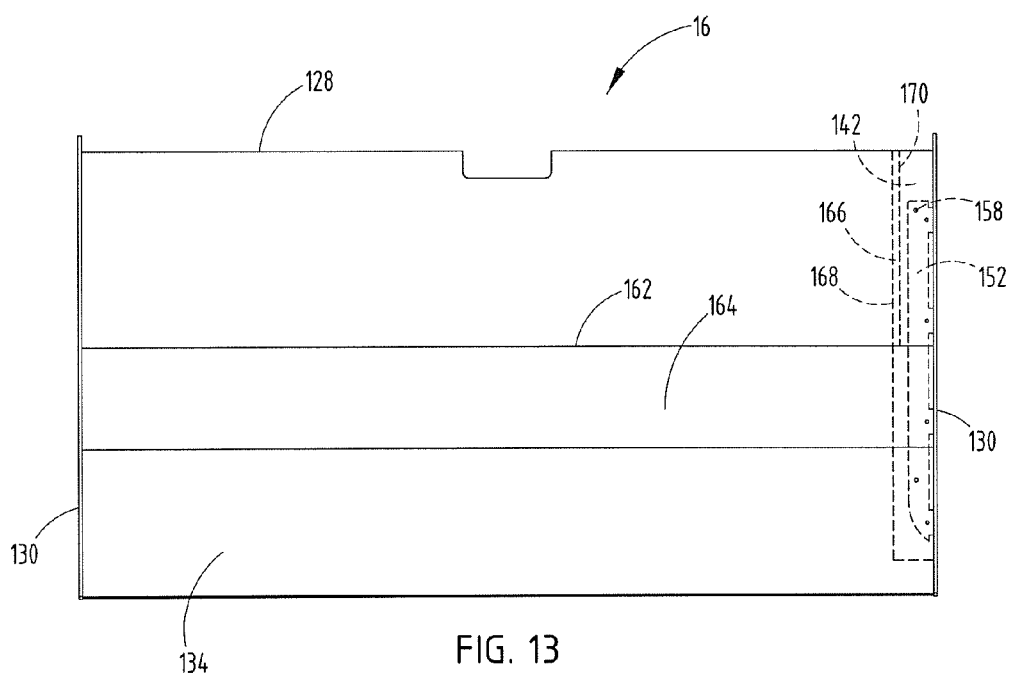
FIG. 13 is a bottom plan view of the first embodiment of the shelf assembly.
Figure 14:
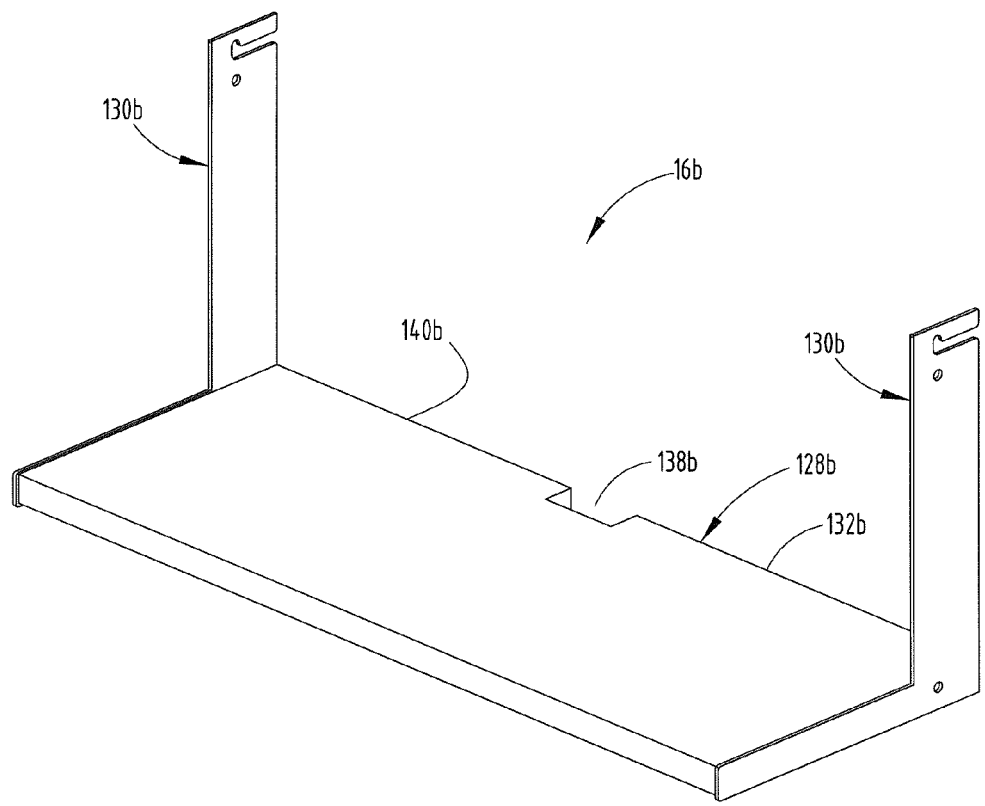
FIG. 14 is a perspective view of a second embodiment of the shelf assembly.
Figure 15:
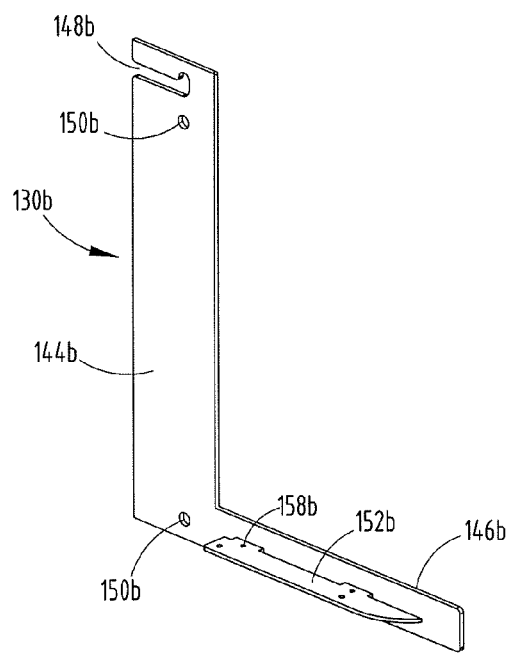
FIG. 15 is a perspective view of a support bracket of the second embodiment of the shelf assembly.

As best illustrated in FIGS. 11 and 13, the lower shelf surface 134 of the shelf member 128 includes a channel 62 that receives a recessed light assembly 164 therein. The channels 142 located in the end surfaces 136 of the shelf member 128 extend to a depth so as to provide a wire routing gap 166 between the arm 152 of the shelf support bracket 130 and an innermost edge 168 of the channel 142, thereby allowing electrical wires 170 to be routed therethrough and provide power to the light assembly 164 in a concealed manner.

In an alternative embodiment, a shelf assembly 16b includes a shelf member 128b and a pair of shelf support brackets 130b. Since the shelf assembly 16b is similar to the previously-described shelf assembly 16, similar parts appearing in FIGS. 10 and 12 and FIGS. 14 and 15, respectively are represented by the same, corresponding reference numeral, except for the suffix "b" in the numerals of the latter. The shelf assembly 16b is similar in construction to the shelf assembly 16 with the main exception being the replacement of the inverted L-shaped shelf support brackets 130 of the shelf assembly 16 with the L-shaped shelf support brackets 130b of the shelf assembly 16b.

In yet another alternative embodiment, a two-shelf assembly 16c (FIG. 16) includes upper and lower shelf members 128c supported by C-shaped shelf support brackets 130c. Since the shelf assembly 16c is similar to the previously-described shelf assembly 16, similar parts appearing in FIGS. 10 and 12 and FIGS. 16 and 17 are respectively represented by the same, corresponding reference numerals except for the suffix "c" in the numerals of the latter. The shelf assembly 16c is similar in construction to the shelf assembly 16, with the most notable exception being the replacement of the inverted L-shaped shelf support brackets 130 of the shelf assembly 16 with C-shaped shelf support brackets 130c and the addition of a second shelf member 128c.

Figure 18:
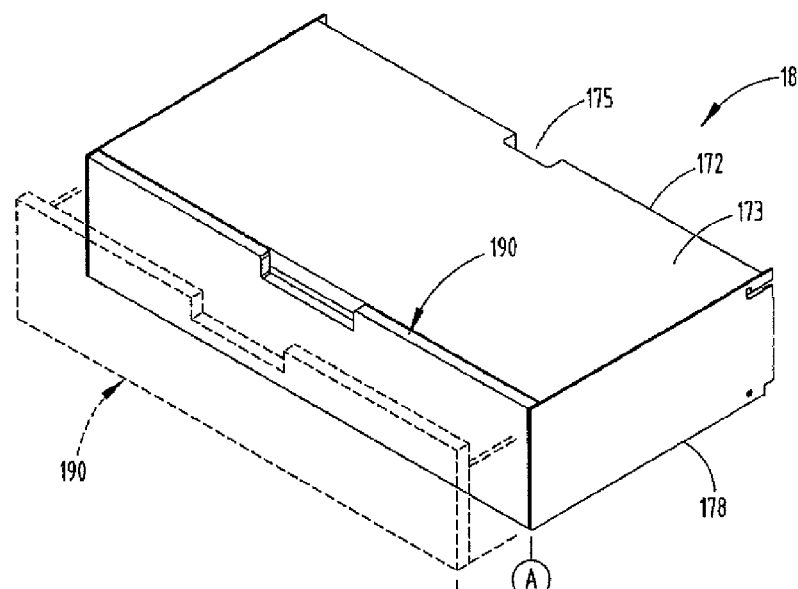
FIG. 18 is a perspective view of a drawer assembly.
Figure 19:
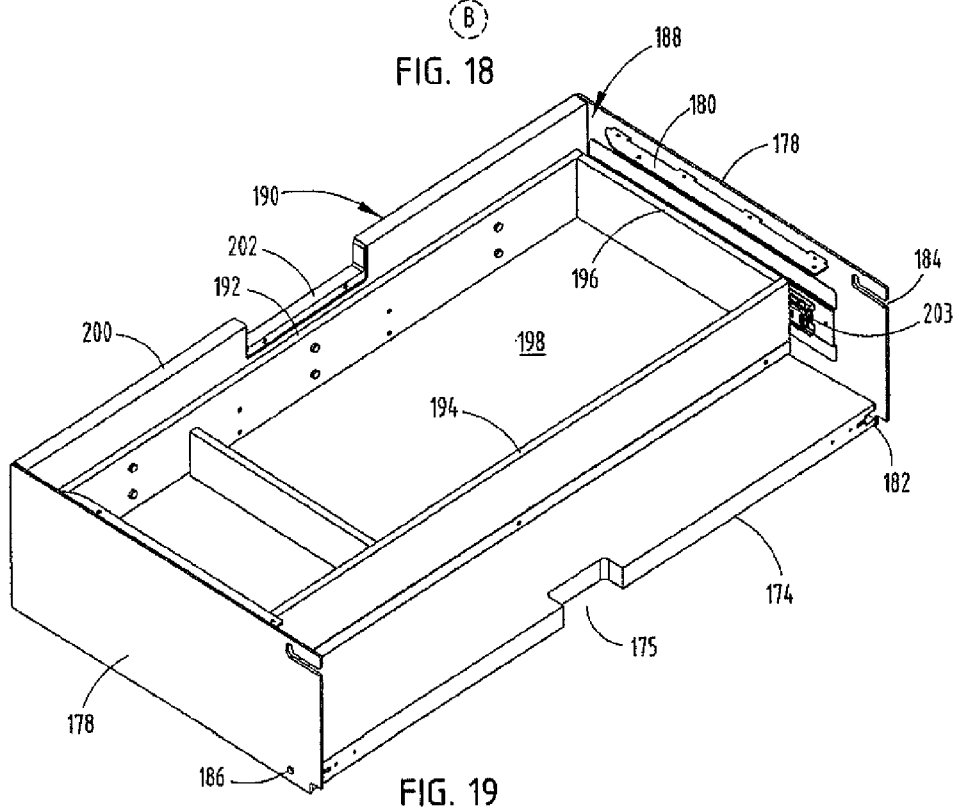
FIG. 19 is a perspective view of the drawer assembly with a top shelf member of the drawer assembly removed to show the inner workings of the drawer assembly.

Each drawer assembly 18 (FIGS. 18 and 19) includes an upper shelf member 172 having an upper shelf surface 173 and a bottom shelf member 174 supported from the support members 124 via a pair of support brackets 178. The upper shelf member 172 and the bottom member 174 each include a relief 175 extending forwardly of a rear edge thereof. Each relief 175 is configured to allow communication and power lines to be vertically routed through the workwall assembly 10 between the member 172, 174 and the wall structure 14. The arms 180 of the support brackets 178 are received within channels 182 of the upper shelf member 172 and the bottom member 174 in a similar manner to the shelf support brackets 130 and the shelf members 128 of the shelf assemblies 16, as described above. Each support bracket 178 includes a mounting slot 184 and a mounting aperture 186 for supporting the support brackets 178 from the support members 124 via a plurality of bolts, similar to the support technique utilized for supporting the shelf assemblies 16. The upper shelf member 172, the bottom member 174 and the support brackets 178 cooperate to define an interior space 188 that receives a drawer 190 therein. The drawer 190 is movable between a retracted position A, wherein the drawer 190 is located within the interior space 188, and an extended position B, wherein the drawer 190 extends outwardly from the interior space 188. The drawer 190 includes a front wall 192, a rear wall 194, a pair of sidewalls 196 and a bottom wall 198. A faceplate 200 is secured to a forward-facing surface of the front wall 192, thereby providing an aesthetic cover to the same, and includes a notch handle 202 therein. The drawer 190 is supported by a pair of telescoping drawer slide assemblies 203. It is noted that the support brackets 178 directly support the drawer 190 via the drawer slide assemblies 202 and directly support the upper shelf member 172 and the bottom member 174.

Figure 20:
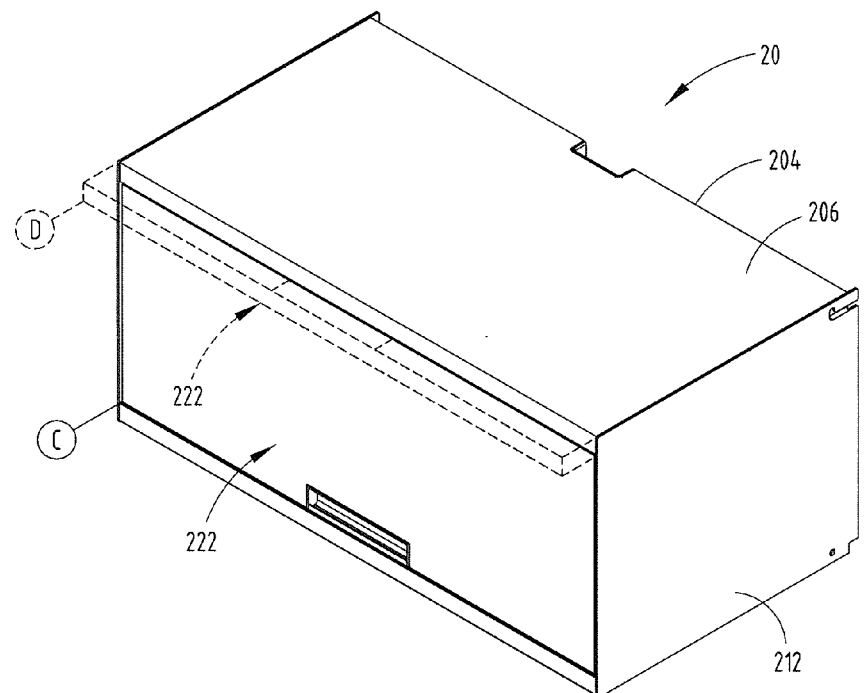
FIG. 20 is a perspective view of a storage assembly.
Figure 21:
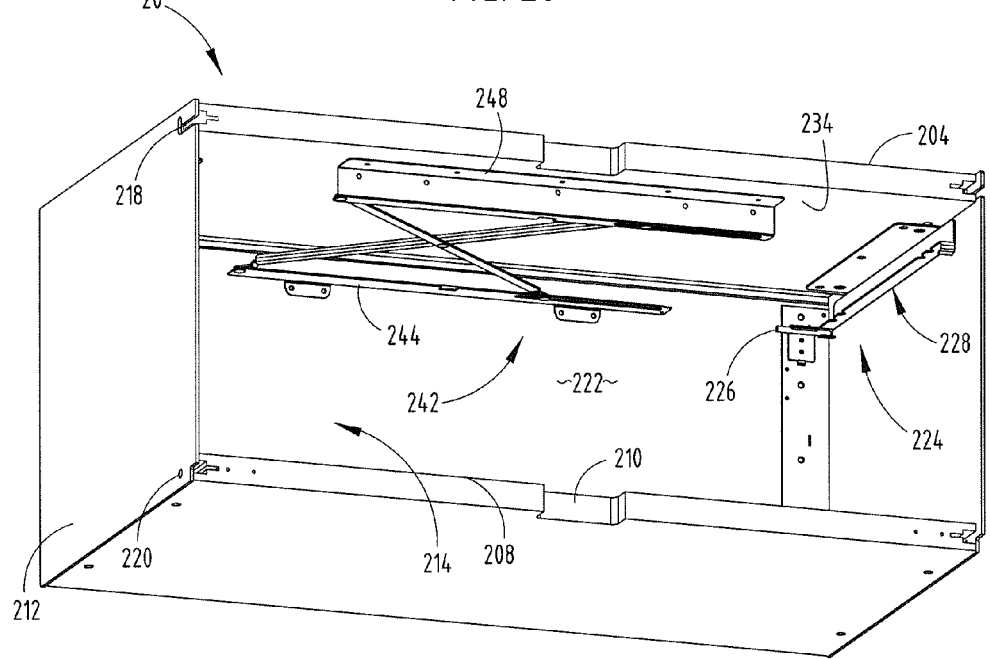
FIG. 21 is a perspective view of the storage assembly showing the inner workings thereof.

Each storage assembly 20 (FIGS. 20-22) includes an upper shelf member 204 having a shelf surface 206, and a bottom member 208. The upper shelf member 204 and the bottom member 208 each include a rectangularly-shaped relief 210 extending forwardly from a respective rear edge thereof. Each relief 210 is adapted to allow communication and power lines to be vertically routed through the workwall assembly 12 between the members 204, 208 and the wall structure 14. The upper shelf member 204 and the bottom member 208 are engaged by and supported by support brackets 212 in a similar manner to the shelf member 128 and shelf support brackets 130 of the shelf assemblies 16, as described above. Each of the support brackets 212 includes a mounting slot 218 and a mounting aperture that receive mounting bolts therein and serve to support the storage assembly 20 from the support members 124, in a similar manner to the technique described above with respect to the shelf assembly 16 and the drawer assembly 18. The door 222 is mounted to the storage assembly 20 such that the door 222 is movable between a closed position C, wherein the door 222 covers the interior space 214, and an open position D, wherein the door 222 is at least partially retracted within the interior space 214 and allows a user access to the interior space 214. The door 222 is movably secured to the overall storage assembly 20 via a pair of side guide assemblies 224. Each side guide assembly 224 includes a guide pin 226 secured to a rear surface of the door 222 at a distance spaced from a top edge of the door 222. The guide pin 226 is adapted to guide along a guide bracket 228 as the door 222 is moved between the closed position C and the open position D. The guide bracket 228 (FIG. 23) includes a body portion 230 that abuts the corresponding support bracket 212, a top flange 232 that is secured to a bottom surface 234 of the upper shelf member 204 via a plurality of mechanical fasteners such as screws 236, and a bottom flange 238 that includes C-shaped stop portions located at opposite ends thereof, and which are adapted to prevent the pin 226 from traveling beyond the stop portions 240 as the pin 226 tracks along a bottom surface of the bottom flange 238 during operation of the door 222.

A center guide assembly 242 includes a front guide member 244 pivotably coupled to the inner surface of the door 222 via a pair of hinges 246, a rear guide member 248 fixedly secured to the bottom surface 234 of the upper shelf member 204 via a plurality of mechanical fasteners such as screws 250, a first cross guide member 252 pivotably coupled at a first end 254 to the front guide member 244 at a pivot point 256, and slidably and pivotably coupled at a second end 258 to the rear guide member 248, such that the first cross guide member 252 guides along a slot 260 within the rear guide member 248, and a second cross guide member 262 pivotably coupled at a first end 264 to the rear guide member 248 such that the second cross guide member 262 pivots about a pivot point 266, and pivotably and slidably coupled at a second end 268 to the front guide member 244, such that the second cross guide member 262 guides along a slot 270 of the second cross guide member 262. The rear guide member 248 (FIG. 23) is provided with a Z-shaped cross-sectional configuration, including a body portion 249, a bottom flange 251 extending orthogonally from the body portion 249, and a top flange 253 extending orthogonally from the body portion 249 in an opposite direction from the lower flange 251.

Figure 25:
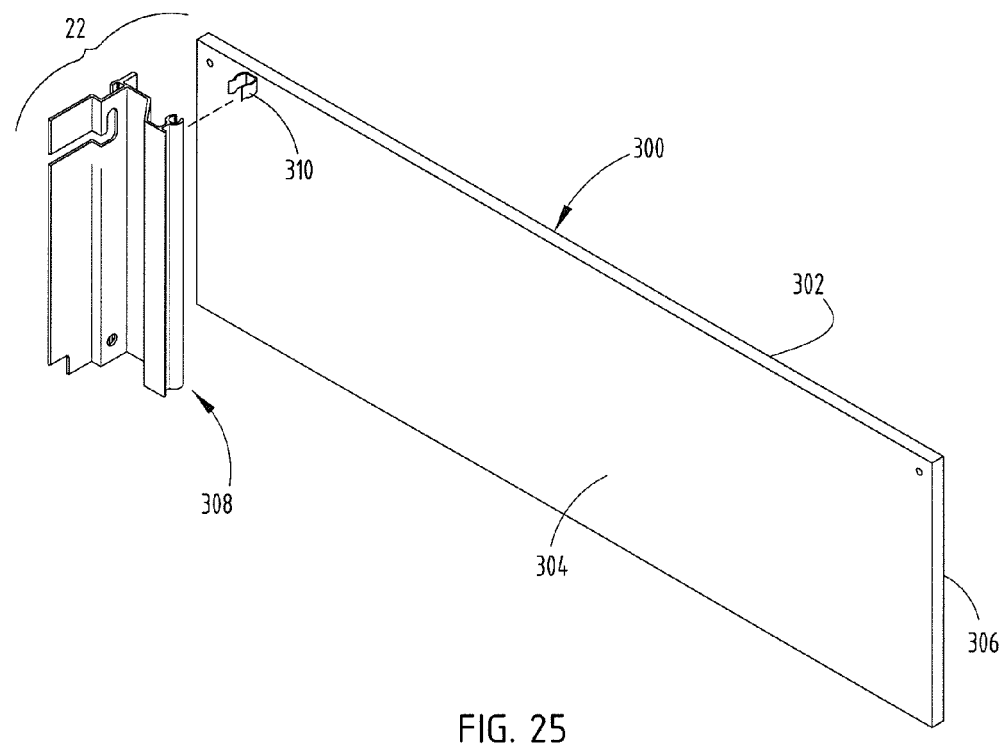
FIG. 25 is an exploded perspective view of a panel assembly.
Figure 26:
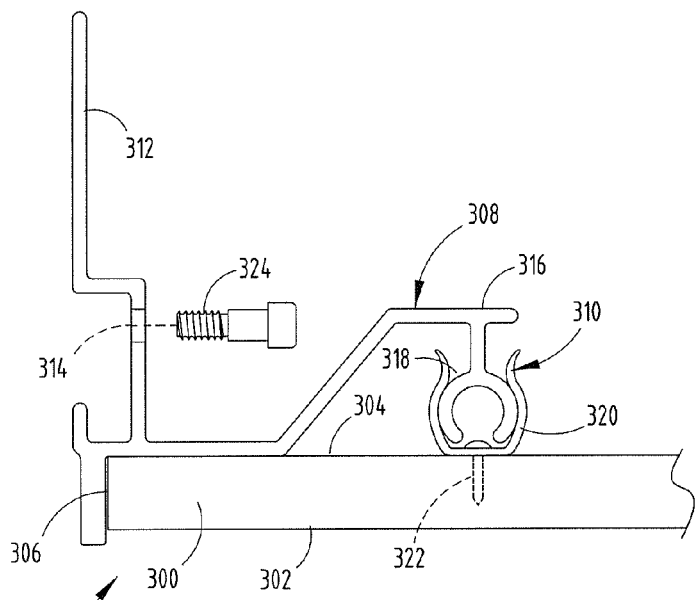
FIG. 26 is a partial top plan view of the panel assembly.

In a first embodiment, the panel assembly 22 (FIG. 25) includes a skin member 300 having a front aesthetic surface 302, a rear surface 304 and a pair of end surfaces 306. In the illustrated example, the skin member 300 is provided an elongated rectangular configuration, however, other geometrical configurations may be utilized. The panel assembly 22 also includes a pair of support brackets 308 supporting the skin member 300 from the frame assembly 12 via a plurality of mounting clips 310. As best illustrated in FIG. 26, each support bracket 308 includes an elongated mounting portion 312 having a pair of mounting apertures 314 spaced along the length thereof, and an arm portion 316 extending inwardly from the mounting portion 312. The arm portion 316 is S-shaped and includes a distally located, C-shaped mounting flange 318 extending orthogonally forward from the arm portion. The arm portion 316 and the flange 318 extend along the length of the support bracket 308. Each mounting clip 310 includes a pair of spring-biased arms 320, and is secured to the rear surface 302 of the skin member 300 via an associated mounting screw 322. It is noted that the panel assembly 22 may alternatively include a two-piece support bracket, wherein a first portion of the bracket extends along an outer edge of the skin member, and a second portion secures the first portion to the supporting structure.

In assembly, the support brackets 308 are secured to the mounting members 124 via mechanical fasteners such as bolts 324 received within the apertures 314 of the support brackets 308 and the apertures 126 of the mounting member 124. The skin member 300 is then removably secured to the support brackets 308 via the engagement of the mounting clips 310 with the flanges 318 of the support brackets 308. It is noted that the panel assembly 22 is configured to be positioned forwardly of the reliefs 138 (FIG. 10), such that the reliefs 138 are hidden from view once the panel assembly 22 is mounted to the frame assembly 22 in proximity to the associated shelf assembly 16.

Figure 16:
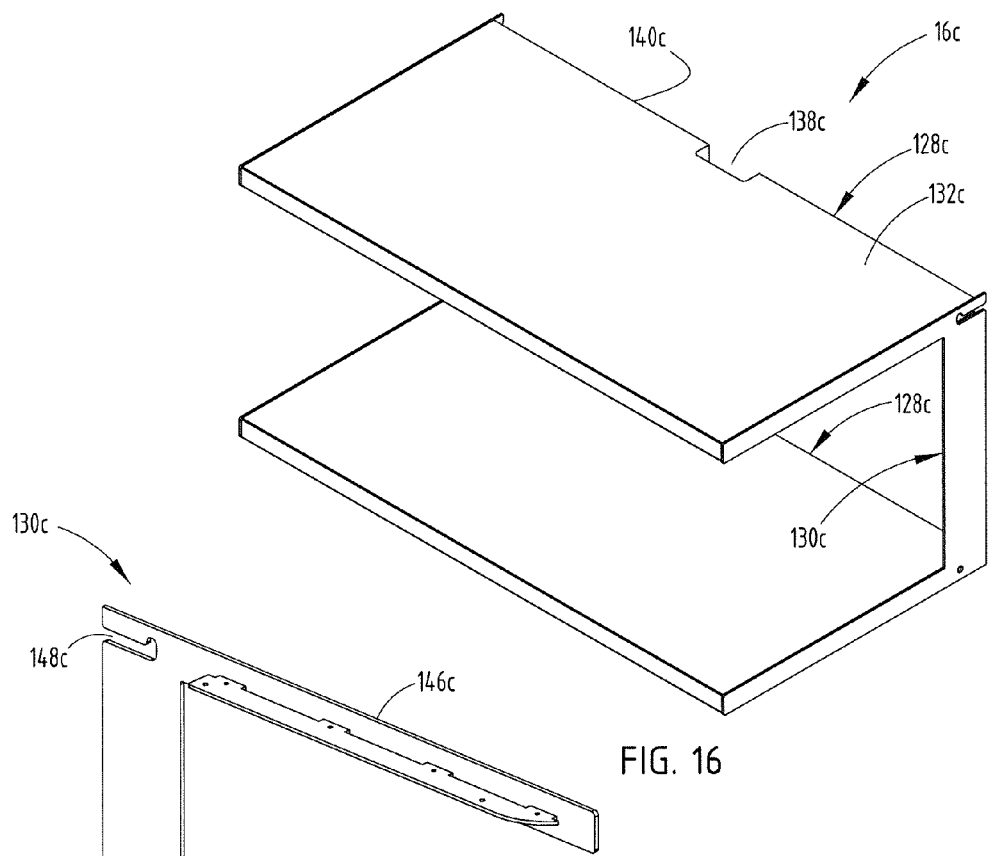
FIG. 16 is a perspective view of a third embodiment of the shelf assembly.
Figure 17:
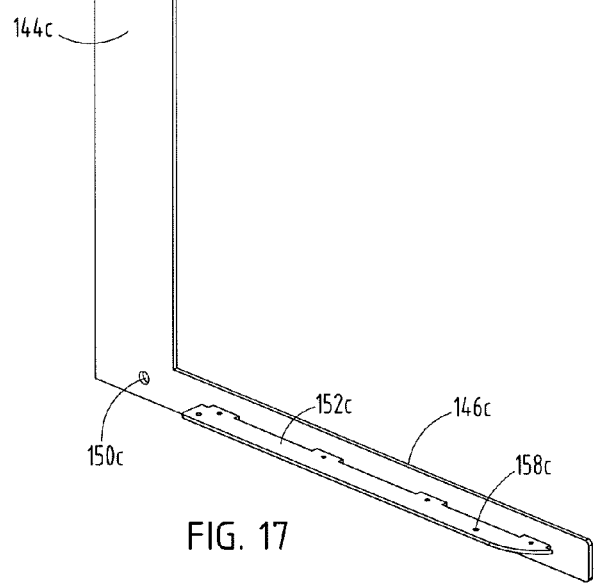
FIG. 17 is a perspective view of a mounting bracket of the third embodiment of the shelf assembly.
Figure 27:
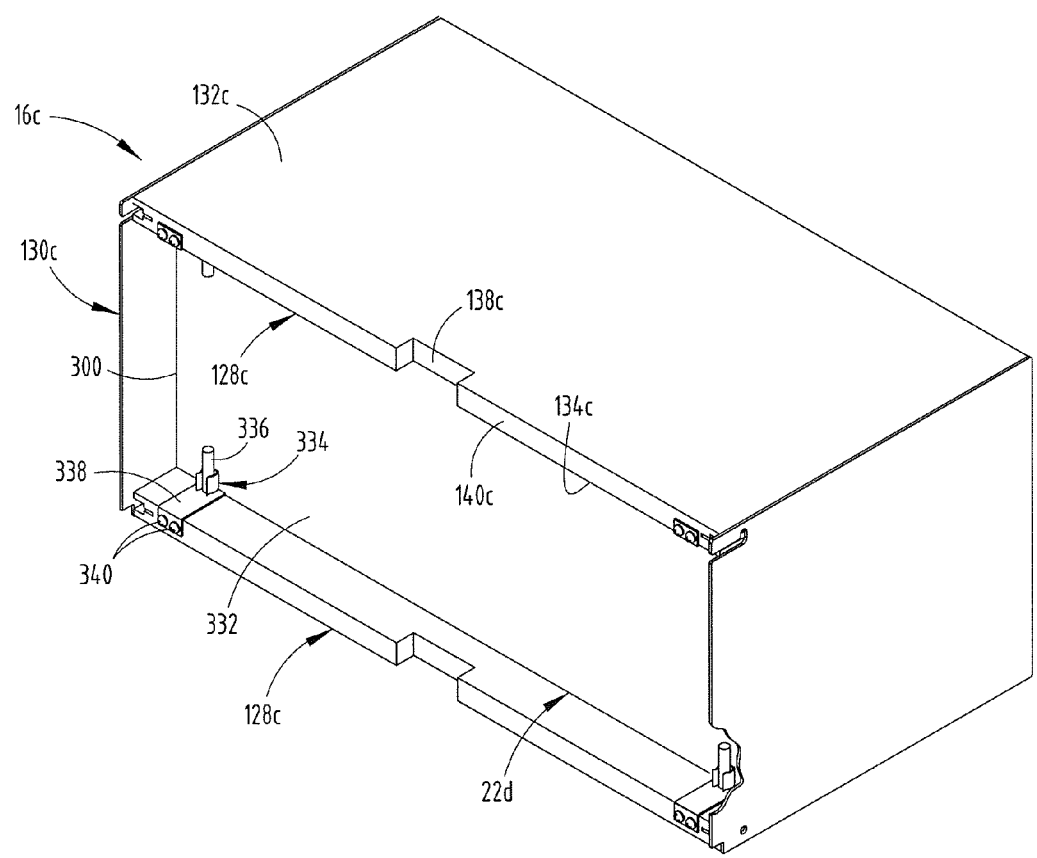
FIG. 27 is a perspective view of an alternative panel assembly within the storage assembly.

In a second embodiment, the panel assembly 22d (FIG. 27) is adapted to be removably secured between any arrangement that includes a pair of spaced apart shelving members, such as the arrangement illustrated in FIG. 16. The panel assembly 22d includes a skin member 330 having a front aesthetic surface (not shown) and a rear surface 332. The skin member 330 is supported between the shelf members 128c via a plurality of mounting clips 334 that releasably engage a plurality of corresponding mounting posts 336. The mounting clips 334 are similar in configuration and operation to the mounting clips 310, as described above. Each mounting post 336 extends downwardly from the bottom surface 134c of the upper shelf member 128c or upwardly from the upper surface 132c of the lower shelf member 128c, and is secured thereto by an associated L-shaped bracket 338. Each bracket 338 is secured to the rear surface 140c of the corresponding shelf member 128c via a pair of mounting screws 340. In the illustrated example, the mounting post 336 is weldably secured to the bracket 338, however, other suitable methods of attachment may be utilized. Similar to the first embodiment of the panel assembly 22, the second embodiment of the panel assembly 22d is configured to be positioned forwardly of the reliefs 138c of the shelf members 128c, such that the reliefs 138c are hidden from view once the panel assembly 22d is mounted to the frame assembly 22 in proximity to the associated shelf assembly. Other support assemblies and brackets may be attached to the frame assembly, such as tables, desks, and other worksurfaces, privacy screens, monitors and the like.

The present inventive office workwall assembly includes a design that may be assembled and secured to an associated wall surface with standard tools by even relatively unskilled personnel. The workwall assembly is efficient in assembly, economical to manufacture, capable of a long operating life, and particularly well adapted for the proposed use. Further, the workwall assembly is highly reconfigurable and allows supported accessories such as shelves, bins, drawers, panel assemblies and the like, to be removed from, added to, or reconfigured with respect to the associated frame assembly, to provide an overall workwall assembly specifically tailored for particular applications. This is accomplished by removing an accessory and replacing it with another. Depending on the spacing of the hook/holes on the accessory bracket. It may be necessary to move the shoulder bolts to different apertures. Alternatively, the shoulder bolts can be relocated and a same accessory moved to a new location.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An office workwall assembly, comprising:
a frame assembly, comprising:
at least a first and second vertical frame members, each of the vertical frame members having a front face and including a longitudinally-extending channel in a rear face;
at least one horizontal frame member extending between and coupled to the first and second vertical frame members, and
at least a first and second frame support brackets including a first portion adapted to be secured to a wall structure, a second portion extending substantially orthogonal to the first portion, and at least one attachment element, wherein the first and second portions are fixed with respect to one another;
at least a portion of the second portion of the first frame support bracket is secured along a vertical length in the channel of the first vertical frame member and at least a portion of the second portion of the second frame support bracket is secured along a vertical length in the channel of the second vertical frame support member;
a fastener engaging one of the vertical frame members and the corresponding one of the frame support brackets at the at least one attachment element, wherein the at least one attachment element is adapted to permit vertical, horizontal, and angular adjustment of the vertical frame member with respect to the corresponding one of the frame support brackets; and
a plurality of attachments between each of the frame members and the frame support brackets, the plurality of attachments located along the second portion of each of the frame support brackets.

2. The workwall assembly of claim 1, wherein the frame assembly is planar and square.

3. The workwall assembly of claim 1, wherein the attachment element is a slot, and wherein the fastener includes a mechanical fastener that engages the slot.

4. The workwall assembly of claim 1, wherein the plurality of attachments include a plurality of fasteners which impinge on a side face of the second portion of the first and second frame support brackets.

5. The workwall assembly of claim 1, wherein the first vertical frame member and the second vertical frame member are secured to their respective frame support brackets at at least a select one of different vertical, horizontal and angular positions from one another.

6. The workwall of claim 1, further comprising an office utility assembly operably coupled with and supported by the first and second vertical frame members, wherein the office utility assembly is cantilevered from the frame assembly.

7. An office workwall assembly, comprising:
a frame assembly, comprising:
a pair of vertical frame members;
at least one horizontal frame member extending between and operably coupled to the pair of vertical frame members, wherein at least one of a group comprising the pair of vertical frame members and the at least one horizontal frame member includes at least one longitudinally-extending channel; and at least one frame mounting bracket positioned within the at least one channel by at least one mechanical fastener, wherein the at least one mounting bracket is secured to a wall structure and supports the frame assembly from the wall structure, wherein the at least one frame member that includes the at least one frame mounting bracket positioned within the at least one channel is adjustable in at least a select one of a vertical direction and a horizontal direction with the at least one frame mounting bracket positioned within the at least one channel while the at least one frame mounting bracket is positioned within the at least one channel by the at least mechanical fastener; and
an office utility assembly operably coupled with and supported by the pair of vertical frame members, wherein the office utility assembly is cantilevered from the frame assembly;
wherein the at least one mechanical fastener impinges on the at least one frame mounting bracket to secure the at least one mounting bracket within the at least one channel.

8. The office workwall assembly of claim 7, wherein the at least one frame mounting bracket includes a first portion adapted to be secured to a wall structure, and a second portion extending substantially orthogonal to the first portion, wherein the second portion is secured within the at least one channel by the at least one mechanical fastener.

9. The office workwall assembly of claim 8, wherein the at least one frame mounting bracket includes a substantially T-shaped cross-sectional configuration.

10. The office workwall assembly of claim 7, wherein the at least one frame mounting bracket is concealed from view within the at least one channel.

11. The office workwall assembly of claim 7, wherein the at least one frame mounting bracket is received within the at least one channel of the pair of vertical frame members.

12. The office workwall assembly of claim 7, wherein the at least one channel includes a first channel that receives the at least one frame mounting bracket, and a second channel that telescopingly receives at least one support member therein, the at least one support member supports the office utility assembly from the frame assembly, and wherein the second channel is accessible from an exterior of the frame member via a slot that extends along a length of the frame member.

13. The office workwall assembly of claim 12, wherein the at least one support member includes a plurality of apertures spaced along a length thereof that are adapted to receive mechanical fasteners therein which support the office utility assembly from the frame assembly.

14. The office workwall assembly of claim 7, wherein the office utility assembly comprises a select one of a group comprising a shelving assembly, a storage assembly and a drawer assembly, and a worksurface assembly.

15. The office workwall assembly of claim 7, wherein the office utility assembly comprises a shelving assembly that includes a shelf member supported from a pair of shelf support brackets operably coupled with the frame assembly and cantilevered therefrom.

16. The office workwall assembly of claim 15, wherein the shelf support brackets are adapted to selectively engage shelf support members at various vertical positions, and wherein the support members are received within corresponding vertical frame members.

17. The office workwall assembly of claim 15, wherein each of the shelf support brackets is substantially L-shaped.

18. The office workwall assembly of claim 15, wherein the shelf member includes channels extending into opposing end surfaces thereof, and wherein each of the shelf support brackets include a first portion operably coupled with the frame assembly and a second portion extending substantially orthogonally from the first portion and received with one of the channels extending into the opposing end surfaces of the shelf member.

19. An office workwall assembly, comprising:
a frame assembly, comprising:
a pair of vertical frame members each including a first longitudinally-extending channel and a second longitudinally-extending channel;
at least one horizontal frame member extending between and operably coupled to the pair of vertical frame members;
a pair of frame mounting brackets each having a first portion adapted to be secured to a wall structure and a second portion extending substantially orthogonal to the first portion and secured within the first channel of the vertical frame members by at least one mechanical fastener, wherein the first and second portions are fixed with respect to one another; and
a pair of support members telescopingly received within the second channel of the vertical frame members, each support member including a plurality of apertures spaced along a length thereof that are adapted to receive mechanical fasteners therein; and
an office utility assembly including a shelf surface and a pair of support brackets coupled with the shelf surface and operably coupled with and supported by the mechanical fasteners received within the apertures of the pair of support members, wherein the office utility assembly is cantilevered from the frame assembly.

20. The office workwall assembly of claim 19, wherein the support brackets are adapted to selectively engage the support members at various vertical positions.

21. The office workwall assembly of claim 19, wherein the office utility assembly comprises a select one of a group comprising a shelving assembly, a storage assembly, a drawer assembly, and a worksurface assembly.

22. A method of securing an office workwall assembly to a wall structure, comprising:
providing a frame assembly, comprising:
a pair of vertical frame members;
at least one horizontal frame member extending between and operably coupled to the pair of vertical frame members, wherein at least one of a group comprising the pair of vertical frame members and the horizontal frame member includes at least one longitudinally-extending channel; and
at least one frame mounting bracket each having a first portion and a second portion extending substantially orthogonally from the first portion, wherein the first and second portions are fixed with respect to one another;
providing an office utility assembly including a shelf surface and a pair of support brackets coupled to the shelf surface;
securing the first portion of each of the frame mounting brackets to a wall structure;
aligning the at least one of the frame members that includes the at least one longitudinally-extending channel with the at least one mounting bracket by at least one mechanical fastener such that the second portion of the at least one mounting bracket is received within the at least one channel of the at least one of the frame members that includes the at least one longitudinally-extending channel;
adjusting at least one of a vertical position and a horizontal position of the at least one of the frame members with respect to the at least one mounting bracket subsequent to the alignment of the at least one of the frame members with the at least one frame member that includes the at least one longitudinally-extending channel;
securing the at least one of the frame members that includes the at least one longitudinally-extending channel to the at least one mounting brackets by a plurality of mechanical fasteners; and
supporting the office utility assembly from the frame assembly by operably coupling the pair of support brackets with the pair of vertical frame members.

23. The method of claim 22, wherein the step of providing the frame assembly further comprises providing the at least one channel as a first channel and second channel, and providing a pair of support members telescopingly received within the second channel of the vertical frame member, and wherein the step of supporting the office utility assembly from the frame assembly includes attaching the pair of support brackets to the support members via a plurality of mechanical fasteners.

24. The method of claim 22, wherein the step of providing the office utility assembly comprises selecting the office utility assembly from a group comprising a shelving assembly, a storage assembly, a drawer assembly, and a worksurface assembly.

* * * * *